Figure 1:
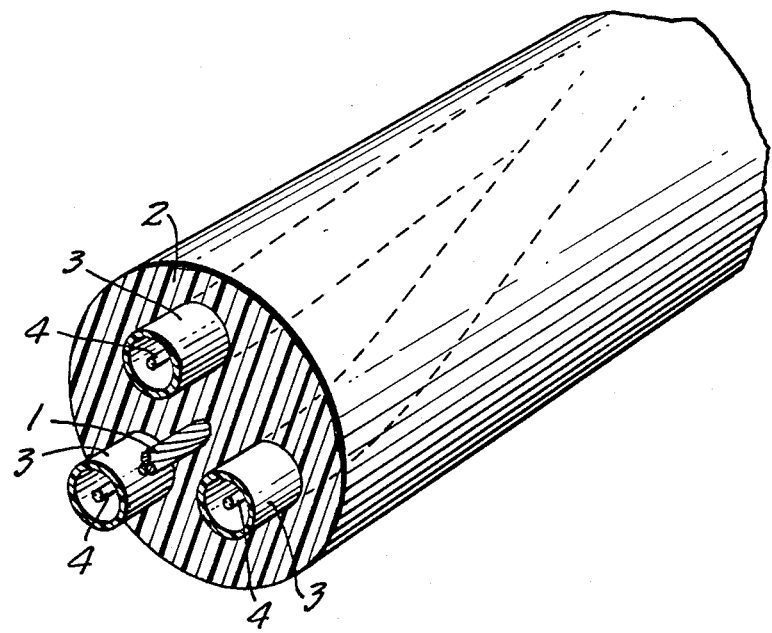

United States Patent [19]

Calzolari et al.

[11] Patent Number: 4,932,746
[45] Date of Patent: Jun. 12, 1990

[54] OPTICAL FIBER CABLE WITH OPTICAL FIBERS IN TUBES UNBONDED TO SURROUNDING CORE

[75] Inventors: Pietro Calzolari; Antonio Portinari, both of Milan, Italy

[73] Assignee: Societa' Cavi Pirelli S.p.A., Milan, Italy

[21] Appl. No.: 197,206

[22] Filed: May 23, 1988

[30] Foreign Application Priority Data

Jun. 1, 1987 [IT] Italy ................................ 20735 A/87

[51] Int. Cl.⁵ ................................................. G02B 6/44
[52] U.S. Cl. .................................................... 350/96.23
[58] Field of Search ....................................... 350/96.23

[56] References Cited

U.S. PATENT DOCUMENTS 4,213,672  7/1980  Aulich et al. ..................... 350/96.23
4,230,395 10/1980  Dean et al. ........................ 350/96.23
4,330,173  5/1982  Oestreich .......................... 350/96.23

*Primary Examiner*—William L. Sikes
*Assistant Examiner*—Robert E. Wise
*Attorney, Agent, or Firm*—Brooks Haidt Haffner & Delahunty

[57] ABSTRACT

An optical fiber cable with a plastic core having longitudinally extending plastic tubes embedded therein, each plastic tube loosely containing at least one optical fiber. The materials of the core and the tubes are selected so that there is no significant bond or link between the outer surfaces of the tubes and the core to permit easy separation of the tubes from the core. Alternatively, there may be layers of a fluid or powder intermediate the outer surfaces of the tubes and the core so that, if desired, the tubes and the core can be made of the same plastic material although, even with this structure, the tubes may be made of a plastic material different from the plastic material of the core.

11 Claims, 1 Drawing Sheet

OPTICAL FIBER CABLE WITH OPTICAL FIBERS IN TUBES UNBONDED TO SURROUNDING CORE

The present invention relates to optical fiber cables of the type comprising a core of plastic material in which small tubes containing optical fibers are partly or completely embedded.

Various cables of the above indicated type are already known. For example, an optical fiber cable of this kind is described in U.S. Pat. No. 3,865,466.

A cable according to said patent has a core of plastic material extruded around a wire or strand made, for example, of metal and practically inextensible when subject to the stresses to be borne by the cable, the wire or strand being situated at the radially innermost portion of the core. Small tubes containing optical fibers are embedded in said core of plastic material.

The small tubes, completely surrounded by and in contact with the plastic material forming the cable core, are also made of plastic material and extend longitudinally of the cable following a path which can be parallel to the cable axis or can have the form of a closed or an open helix with respect to said axis. In the particular embodiment of the cable according to said patent, the plastic materials forming the core and the small tubes are both formed from a polyethylene based composition. Consequently, since the materials are the same, the small tubes are unavoidably bonded or otherwise linked to the plastic material forming the cable core in which they have been embedded during the forming of the core by extrusion.

Another already known cable of this type is disclosed in U.S. Pat. No. 4,191,448 and it differs from the cable disclosed in U.S. Pat. No. 3,865,466 in respect of the particular structure of the small tubes containing the optical fibers.

In fact, the small tubes of the cable of U.S. Pat. No. 4,191,488 are obtained from a tape of plastic/metal laminate shaped helically into a tubular form. Also, in the cable of U.S. Pat. No. 4,191,448, the small tubes are linked to the plastic material forming the core into which they are embedded. In these conventional cables, the link or bond existing between the plastic material forming the core and the small tubes containing the optical fibers gives rise to serious difficulties when joints are to be effected. In fact, to carry out a joint, the cables' ends are prepared by stripping the terminal portion of their components and in particular, the mechanically resistant wire or strand, the small tubes and the optical fibers with respect to the cable core to effect subsequently the connection between the individual elements of the two cables.

The link or bond which, in the conventional cables of the above-described type, exists between the small tubes and the cable core of plastic material makes the operation of stripping the terminal portions of the small tubes extremely difficult, troublesome and often practically impossible.

The same difficulties are encountered when the cables are to be connected to the apparatus used therewith, such as receivers, transmitters, repeaters and the like, because, for these connections, the ends of the cables are to be prepared as required for the joints.

Both the cable core of plastic material and the small tubes carry out a mechanical protective function for the optical fibers. Whenever in the conventional cables the impossibility in practice of stripping the ends of the small tubes with respect to the core is found, a reduced protection of the optical fibers during the forming of joints and connections to the various types of apparatus used therewith cannot be ensured with a consequent increase in the risk of subjecting the optical fibers to prejudicial stresses.

One object of the present invention is the provision of optical fiber cables of the type comprising a core of plastic material embedding small tubes containing optical fibers which do not have the disadvantages described hereinbefore.

In accordance with the present invention, an optical fiber cable comprising a core of plastic material embedding at least one small tube which extends longitudinally along said core and which contains at least one optical fiber is characterized in that the materials of the tubes and the core are selected or an adhesion preventing material is provided at the zone of contact between the small tubes and the plastic material of the core embedding them so as to prevent or substantially reduce adhesion between the tubes and the core.

Figure 2:
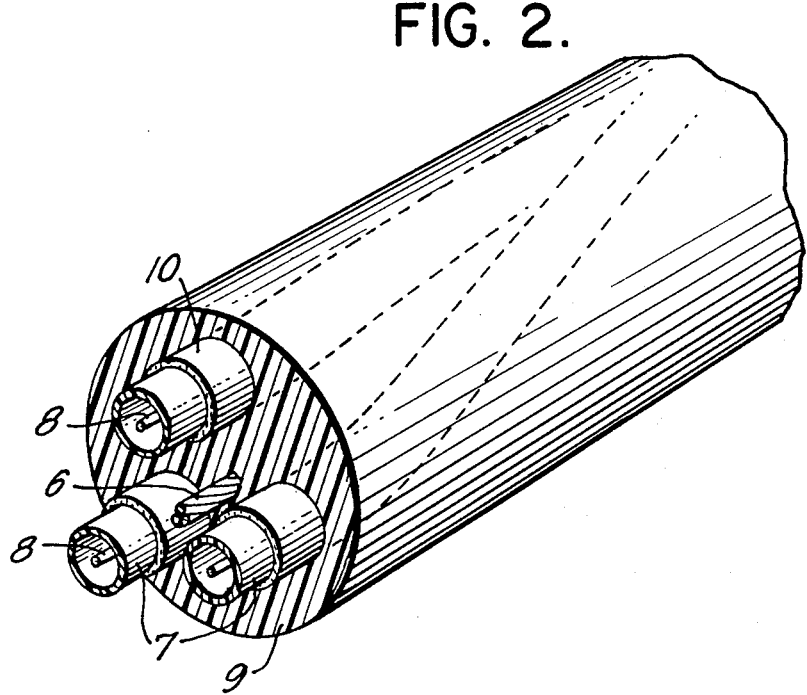

Other objects and advantages of the present invention will be apparent from the following detailed description of the presently preferred embodiments thereof, which description should be considered in conjunction with the accompanying drawings in which:

FIG. 1 is a perspective view of a portion of cable according to the invention; and FIG. 2 is a perspective view of a portion of cable according to an alternative embodiment of the invention.

A cable according to the invention has a body of plastic material constituting the cable core which preferably is provided with a mechanically resistant wire or strand which occupies its radially innermost portion.

At least one small tube, containing at least one optical fiber, is at least partially embedded, and preferably, is completely embedded, in the body of plastic material forming the cable core.

The small tube can extend longitudinally within the cable core, parallel to the axis thereof, but preferably, it follows a helical path around said axis. In the latter case, the helical path can have the shape of a closed helix or of an open helix, namely can be formed by alternate S-shaped or Z-shaped portions.

The significant feature of a cable according to the invention is the prevention of significant adhesion between the outer surface of the small tube and the plastic material of the core embedding it.

In the present application, the expression "anti-adhesion means" refers to any expedient which is able to avoid a bond between the small tubes and the core of plastic material embedding them which makes it difficult to separate the tubes from the core, but which either allows a direct contact between them or, alternatively, is a material interposed between the tubes and the core which does not cause any discontinuity of material in the cable.

The embodiment of a cable according to the invention shown in FIG. 1 has the following structure. A strand 1, formed, for example, by a plurality of wires made of metal, glass fiber, aromatic polyamide and the like occupies the radially innermost region of the cable and is coaxial to the cable axis.

The strand 1 has a size such that it is mechanically resistant, and practically inextensible, under any mechanical tensile stress to which the cable may be subjected during its manufacture and/or laying.

Around strand 1, there is a body 2 of plastic material having circular shape in the section perpendicular to the cable axis, and which adheres to the outer surface of said strand and is in contact with it.

Small tubes 3, extending along the cable in the form of an open helix, are completely embedded in the body 2 of plastic material and are in direct contact with it. Each small tube loosely contains an optical fiber 4.

The small tubes 3 are made of a material which will not form a strong bond or link with the plastic material forming the cable core 2. If the tubes 3 are made of several superimposed layers, at least the radially outermost layer is made of such a material. In the present specification, the term "non-adhering" and "unbonded" as they refer to the materials of the two components, means that they have such a chemical nature that, when they are brought into mutual contact, even at the softening temperature of at least one of them, they do not form a bond or a link along the mutually contacting surfaces sufficient to prevent easy separation of the tubes 3 from the core 2. Preferably, there is a complete absence of a bond or link therebetween. For example, one of the components, either the small tubes 3 or the core 2 can be of a material selected from polybutene terephthalate and polyamides, whereas the plastic material forming the other component can be made of a material selected from low density polyethylene, polypropylene and polyurethanes so that the tubes 3 and the core 2 are made of different materials.

In the cable of FIG. 1, the differences between the materials forming the small tubes 3 and the cable core 2 represents one embodiment of the anti-adhesion means. Other elements used in conventional cables and not shown in FIG. 1 can be present around body 2 forming the cable core. Such elements can be a sheath, covering layers for the latter made of a plastic material having a low friction coefficient to facilitate the cable sliding during the laying operation and the like.

FIG. 2 represents an alternative embodiment of a cable according to the invention. The cable shown in FIG. 2 comprises components which are the same as the components shown in FIG. 1, that is, it comprises a mechanically resistant strand 6, a plurality of small tubes 7 containing an optical fiber 8 and a body 9 of plastic material embedding the tubes and the strand. The cable represented in FIG. 2 differs from the cable of FIG. 1 in that, between the outer surface of the tubes 7 and the plastic material of core 9, there is an anti-adhesion layer 10 formed by a liquid or doughy material and in general, by a fluid having a viscosity ranging between 1 and 100,000 cts, selected for example, among silicone oils, water emulsions of silicone oils, silicone greases, petroleum jelly and the like.

This layer 10, preventing any bond or link between the small tubes 7 and the cable core 9, constitutes another anti-adhesion means between said elements, and in this case, no limitation exists in choosing the materials intended to form the small tubes 7 and the cable core 9.

In an alternative embodiment of the cable shown in FIG. 2, said layer 10 can be a layer of powder interposed between the outer surface of the small tubes 7 and the plastic material of the core 9 in which they are embedded.

Said layer of powder forming layer 10 constitutes another embodiment of anti-adhesion means between the small tubes 7 and the plastic material forming the core 9, again avoiding limitations on the materials forming said tubes 7 and said core 9.

Powders able to carry out the above indicated action are, for example, mica powder, talc powder and the like. Preferably, to form layer 10, said powders are applied by the use of any substance which is able to retain the powder on the outer surface of the small tubes 7. An example of said substance is, for example, a grease covering the surface of the tubes and retaining the powders on itself.

From the description of the specific embodiments of a cable according to the invention and from the following considerations, it will be seen that the invention achieves the objects of the invention.

The presence of anti-adhesion means between the outer surface of the small tubes and the plastic material embedding them results in ensuring the independence of the small tubes with respect to the plastic material embedding them, but at the same time, does not give rise to any discontinuity of material in the cable structure.

Said independence of the tubes and the cable core of plastic material embedding them, both having the task of protecting, at least mechanically, the optical fibers contained in the cable, has the effect of making possible, at the ends of the cables, the removal of the protections of said optical fibers in an expeditious and easy manner by simply, at first, forming a groove or notch in the plastic material by a blade and then removing it by cutting.

As these operations are facilitated by the absence of any bond or link between the small tubes and the core, they can be effected with care so that the risk of damaging the small tubes during the core removal is greatly reduced.

Although preferred embodiments of the present invention have been described and illustrated, it will be apparent to those skilled in the art that various modifications may be made without departing from the principles of the invention.

We claim:

1. An optical fiber cable comprising a core of plastic material having a plurality of tubes embedded therein and which extend longitudinally along said core, said core encircling each of said tubes individually and at least one optical fiber loosely received within each said tube, said cable being characterized in that the outer surfaces of said tubes are unbonded to the material of said core so that said core is readily separable from said tubes with removal of the material of said core but the cable is without empty space between said outer surfaces of said tubes and the material of said core whereby at a cable end, the material of said core can be readily stripped from said tubes leaving the optical fibers protected by said tubes.

2. An optical fiber cable as set forth in claim 1, characterized in that said outer surface of each of said tubes is in contact with the material of said core and at least the material radially forming the outermost surface of each of said tubes is made of a material which is different from said plastic material of said core and which is non-adhesive with respect to said plastic material of said core.

3. An optical fiber cable as set forth in claim 2, characterized in that one of said plurality of tubes and said core is made of a material selected from the group consisting of polybutene terephthalate, polyamides, low density polyethylene and polypropylene, and the other of said plurality of tubes and said core is made of polyurethane.

4. An optical fiber cable as set forth in claim 2, characterized in that one of said plurality of tubes and said core is made of a material selected from the group consisting of polybutene terephthalate and polyamides, the other of said plurality of tubes and said core is made of a material selected from the group consisting of low density polyethylene, polypropylene and polyurethanes.

5. An optical fiber cable as set forth in claim 1, characterized in that there is a layer of a fluid, having a viscosity ranging between 1 and 100,000 centistokes interposed between said outer surfaces of said tubes and the plastic material of said core.

6. An optical fiber cable as set forth in claim 5, characterized in that said fluid is selected from the group consisting of silicone oil, a water emulsion of silicone oil, a silicone grease and a petroleum jelly.

7. An optical fiber cable as set forth in claim 1, characterized in that there is a layer of powder interposed between said outer surfaces of said tubes and the plastic material of said core.

8. An optical fiber cable as set forth in claim 7, characterized in that said powder is dispersed in a grease.

9. An optical fiber cable as set forth in claim 7, characterized in that the powder is selected from the group consisting of mica powder, talc powder and mixtures thereof.

10. An optical fiber cable as set forth in claim 1 wherein the cable further comprises a strand disposed centrally of, and extending longitudinally of said core, said strand being substantially inextensible under any mechanical stress to which the cable may be subjected during manufacture and laying, and wherein said tubes are disposed in radially spaced relation to said strand with material of said core intermediate said tubes and said strand and are disposed in spaced relation to each other in the direction circumferentially of said strand with material of said core intermediate said tubes.

11. An optical fiber cable as set forth in claim 10 wherein each of said tubes has an inner layer of plastic material and an outer layer of plastic material surrounding and contacting said inner layer, and wherein the plastic material of said outer layer is different from and non-adhesive with respect to the plastic material of said core.

* * * * *